US012413477B1

(12) United States Patent
Chaturvedi et al.

(10) Patent No.: US 12,413,477 B1
(45) Date of Patent: Sep. 9, 2025

(54) PROVIDING A MEDIATION LAYER BETWEEN A VIRTUAL NETWORK FUNCTION MANAGER AND VIRTUAL NETWORK FUNCTIONS SUPPORTING DIFFERENT PROTOCOLS

(71) Applicant: INTERNATIONAL BUSINESS MACHINES CORPORATION, Armonk, NY (US)

(72) Inventors: Anand Chaturvedi, Manalapan, NJ (US); Thontadarya C. Telagi, Holmdel, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/664,065

(22) Filed: May 14, 2024

(51) Int. Cl.
| | |
|---|---|
| H04L 13/16 | (2006.01) |
| H04L 12/24 | (2006.01) |
| H04L 12/26 | (2006.01) |
| H04L 13/00 | (2006.01) |
| H04L 29/08 | (2006.01) |
| H04L 29/12 | (2006.01) |
| H04L 41/0895 | (2022.01) |
| H04L 41/122 | (2022.01) |

(52) U.S. Cl.
CPC ........ *H04L 41/0895* (2022.05); *H04L 41/122* (2022.05)

(58) Field of Classification Search
CPC ... H04L 41/0895; H04L 41/122; H04L 13/16; H04L 13/00; H04L 12/6418; H04L 12/26; H04L 12/24; H04L 29/12; H04L 29/08

USPC .......................................................... 709/220
See application file for complete search history.

(56) References Cited

U.S. PATENT DOCUMENTS

| | | | |
|---|---|---|---|
| 7,904,599 B1 * | 3/2011 | Bennett | ............... H04L 67/1097 709/249 |
| 9,800,673 B2 | 10/2017 | Parikh | |
| 9,935,818 B1 * | 4/2018 | Kim | .................... H04L 41/0681 |
| 11,297,171 B2 | 4/2022 | Chun | |

(Continued)

OTHER PUBLICATIONS

"Method and System for Provisioning of Resources in a Virtualized Carrier Network Environment," IP.com, IP.com No. IPCOM000236162D, Apr. 10, 2014, 5 pp.

(Continued)

*Primary Examiner* — Jude Jean Gilles
(74) *Attorney, Agent, or Firm* — KONRAD, RAYNES, DAVDA & VICTOR LLP; David W. Victor (57) ABSTRACT

Provided are a computer program product, system, and method for providing a mediation layer between a virtual network function manager and virtual network functions supporting different protocols. A first command is received in a first communication protocol to perform an operation at a target virtual network function component managing a virtual resource. A determination is made of a second command in a second communication protocol mapping to the first command to perform a function of the first command at the target virtual network function component. The second command is communicated, using the second communication protocol, to the target virtual network function component to perform an operation with respect to the virtual resource managed by the target virtual network function component.

20 Claims, 5 Drawing Sheets

(56) References Cited

U.S. PATENT DOCUMENTS

| | | | |
|---|---|---|---|
| 11,349,708 B2 | 5/2022 | Chakrapani Rangarajan | |
| 11,593,143 B2 | 2/2023 | Banerjee | |
| 2011/0075052 A1* | 3/2011 | Arling | H04N 21/42204 |
| | | | 348/734 |
| 2014/0180447 A1* | 6/2014 | Chen | H04L 12/6418 |
| | | | 700/90 |
| 2018/0376358 A1* | 12/2018 | Uppili | H04W 24/04 |

OTHER PUBLICATIONS

"Network Functions Virtualization (NFV): Management and Orchestration," ETSI, 2018, 13 pp.

"Network Functions Virtualization (NFV): Management and Orchestration," ETSI, Dec. 2014, 13 pp.

"Network Functions Virtualization Cross-Connect," IP.com, IP.com No. IPCOM000257940D, Mar. 25, 2019, 9 pp.

"Understanding Virtual Network Function Descriptors," Cisco, Cisco Elastic Services Controller 4.1 User Guide, 2020, 4 pp.

"Virtual Network Commissioning," IP.com, IP.com No. IPCOM000272157D, Apr. 21, 2023, 13 pp.

"Virtualizing a Backplane and a Control and Timing Module Used in a Modular Network Element," IP.com, IP.com No. IPCOM000265563D, Apr. 23, 2021, 18 pp.

"VMware Telco Cloud Automation User Guide," VMware, 2023, 406 pp.

"Oracle Communications Policy Management," Oracle, Oracle White Paper, Feb. 2017, 12 pp.

"VCloud NFV OpenStack Edition Reference Architecture," VMware, Inc., 2018, 69 pp.

"What is NFV (Network Functions Virtualization)? Definition," SDxCentral Studios, 3 pp. [Online] [retrieved Apr. 10, 2024] https://www.sdxcentral.com/networking/nfv/definitions/whats-network-functions-virtualization-nfv/.

Architecting a vCloud NFV Platform, Reference Architecture, Version 2.0, VMware, 2017, pp. 49.

Bernal, et al., "Cloud-Based Network Function Virtualization Using OPNFV Components," ResearchGate, Conference Paper, Jan. 2021, 11 pp.

\* cited by examiner

PROVIDING A MEDIATION LAYER BETWEEN A VIRTUAL NETWORK FUNCTION MANAGER AND VIRTUAL NETWORK FUNCTIONS SUPPORTING DIFFERENT PROTOCOLS

BACKGROUND OF THE INVENTION

1. Field of the Invention

The present invention relates to a computer program product, system, and method for providing a mediation layer between a virtual network function manager and virtual network functions supporting different protocols.

2. Description of the Related Art

Virtual network functions (VNFs) are software applications that deliver network functions such as directory services, routers, firewalls, load balancers, and more. They are deployed on virtual machines (VMs) and may be deployed by telecommunications providers in their digital transformation from the physical network functions (PNFs) of legacy network appliances on proprietary hardware. Virtual network functions (VNFs) are virtualized tasks formerly carried out by proprietary, dedicated hardware.

VNFs move individual network and network security functions out of dedicated hardware devices and into software that runs on commodity hardware. These tasks, used by both network service providers and enterprises, include routers, firewalls, domain name system (DNS), load balancing, caching and network address translation. VNFs run within virtual machines (VMs) or containers.

SUMMARY

Provided are a computer program product, system, and method for providing a mediation layer between a virtual network function manager and virtual network functions supporting different protocols. A first command is received in a first communication protocol to perform an operation at a target virtual network function component managing a virtual resource. A determination is made of a second command in a second communication protocol mapping to the first command to perform a function of the first command at the target virtual network function component. The second command is communicated, using the second communication protocol, to the target virtual network function component to perform an operation with respect to the virtual resource managed by the target virtual network function component.

DETAILED DESCRIPTION

In current implementations of Network Functions Virtualization (NFV), the VNF manager learns support automation and supported protocol for the VNF component from the VNF descriptors. However, if the VNF manager does not provide support for the protocol supported by the VNF components, then custom development and programming is required to allow the VNF manager to submit commands to such unsupported VNF components.

Described embodiments provide improvements to the VNF manager and management of a VNF by providing a VNF controller component that provides a mediation layer that may reside on the same tenant as the VNFs and virtualization layer. The VNF controller component may learn supported automation of the VNF by reading a VNF descriptor. The VNF controller component may map commands and Application Programming Interfaces (APIs) defined in the VNF descriptors to the APIs of the specific protocol supported at the VNF components. In this way, the VNF controller component exposes the interface at the VNF manager to take actions on the VNF controller component that are then mapped to the specific protocol supported at the VNF components.

With described embodiments, the VNF controller component provides a mediation layer to resolve the dependency of configuration protocol and avoids the need for custom development for non-supported protocols at the VNF components to onboard the VNF components to the orchestrator node including the VNF manager. Further, in certain embodiments, locating the VNF controller locally to the VNF components and virtualization layer reduces cross traffic between the VNF manager and the virtual network functions at the tenant location. The VNF controller component provides an intelligent adapter layer to translate southbound protocol APIs supported at the VNF components to a northbound API over a protocol supported by the VNF manager and orchestrator node.

Figure 1:
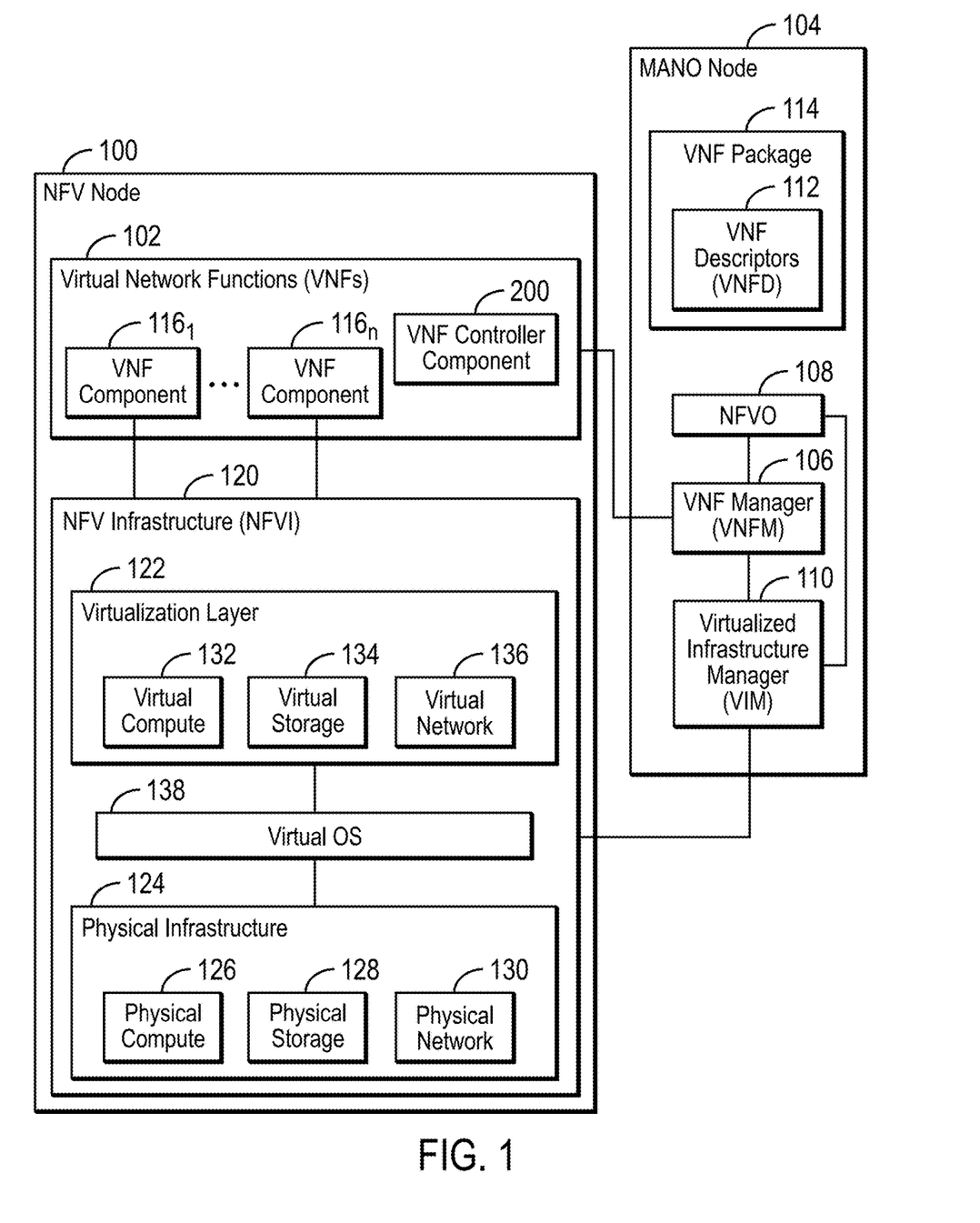
FIG. 1 illustrates an embodiment of a network function virtualization (NFV) environment.

FIG. 1 illustrates an embodiment of a Network Functions Virtualization (NFV) architecture having a NFV node 100 providing the physical compute, storage, and network hardware that hosts virtual network functions (VNFs) 102. There may be multiple NFV nodes 100 deployed in multiple tenant sites and regions. A management and network orchestration (MANO) node 104 comprises components, such as a VNF manager (VNFM) 106, NFV orchestrator (NFVO) 108, and a Virtual Infrastructure Manager (VIM) 110, that manage the initialization and operation of virtual network functions (VNFs) 102. In certain embodiments, the MANO node 104 may be implemented in a geographically remote location from the NFV nodes 100. The MANO 104 reads VNF descriptors (VNFD) 112, included in a VNF package 114, that describe the instantiation parameters and operational behaviors of the VNFs 102, including key performance indicators and other key requirements that can be used in the process of onboarding and managing the lifecycle of the VNF components 104$_i$. The VNF package 114 may further include additional components, such as a manifest file, VNF software image, and additional files.

The NFV orchestrator (NFVO) 108 coordinates the resources and networks needed to set up cloud-based services and applications in the NFV nodes 100. The VNF manager 106 manages the life cycle of VNF components (VNFC) 116$_1$ . . . 116$_n$ and the VNF controller component 200 including creating, maintaining, updating and terminating VNF components 116*i* and the VNF controller component 200. The virtualized infrastructure manager (VIM) 110 controls and manages an NFV infrastructure (NFVI) 120 that provides the physical infrastructure 124 that hosts the VNFs 102 and virtualization layer 122. There may be many NFV infrastructure (NFVI) nodes 120 deployed and controlled geographically. NFVI nodes 120 are deployed at multiple sites and regions to provide service high-availability, and to support locality and workload latency requirements.

The NFVI node 120 includes a virtualization layer 122 that provides a physical resource abstraction of a physical infrastructure 124 including a physical compute 126, e.g., processors, physical storage 128, and physical network 130 resources, comprising the physical hardware components. The virtualizes layer 122 includes virtual compute 132, virtual storage 134, and virtual network 136 comprising the allocatable virtual implementation of the physical components 126, 128, 130, respectively. A virtual operating system 138, also known as a hypervisor, virtual machine monitor or virtual machine manager, that creates and runs virtual machines, or the components in the virtualization layer 122.

The NFV node 100 and the MANO node 104 may comprise separate computing environments, at different geographical locations, implemented in several server systems. Different NFV nodes 100 may be located at different data centers implemented in multiple servers throughout the data centers. The physical compute 126 may comprise server processing resources, including central processing units (CPUs), one or a group of multiple cores on a single CPU, or a group of processing resources on one or more CPUs. The physical storage 128 may comprise a plurality of storage devices, such as solid-state storage devices (SSDs), hard disk drives, tape drives, etc., which may be organized in a Redundant Array of Independent Disks (RAID) or Just a Bunch of Disk (JBOD) configuration. Physical storage 128 may also comprise memory resources, such as non-volatile and volatile memory devices. The physical network 130 may comprise various network resources, including network routers, modems, as well as bandwidth in a Storage Area Network (SAN), a Local Area Network (LAN), a Wide Area Network (WAN), the Internet, and Intranet, etc.

Figure 2:
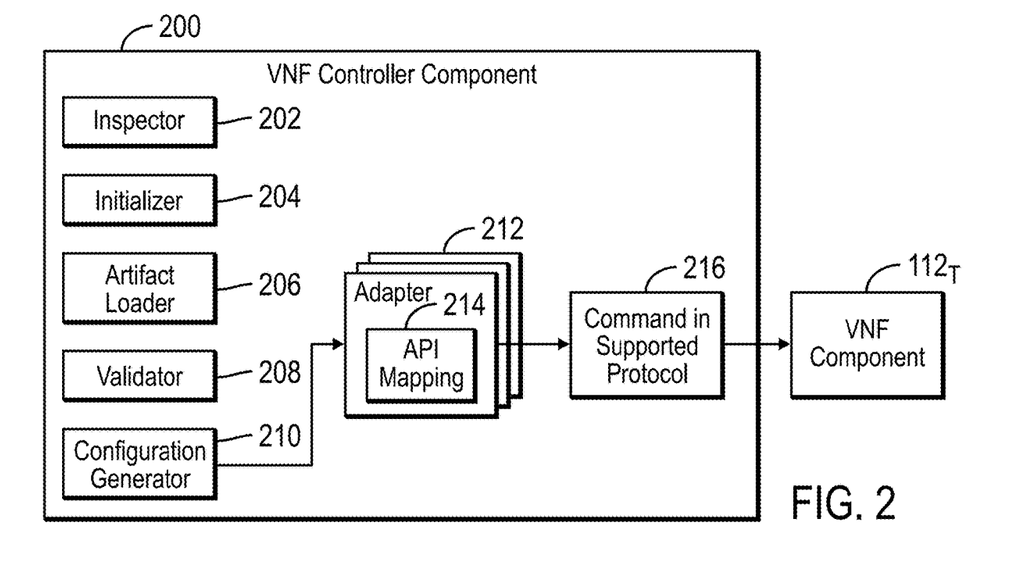
FIG. 2 illustrates an embodiment of a virtual network function (VNF) controller component.

FIG. 2 illustrates an embodiment of a VNF controller component 200, including: an inspector 202 that reads the VNF descriptors 112 to understand the supported automation protocol and other parameters of the VNF components $116_i$. an initializer 204 to read the inspector 202 input and create rules to initialize the VNF controller component 200 and start the VNF controller component 200; an artifact loader 206 to load the VNF components $116_1 \ldots 116_n$; a validator 208 to validate an incoming request from the VNF manager 106 with respect to target VNF components $116_T$ to which the incoming request is directed; a configuration generator 210 that generates a payload to provide to the target VNF components $116_T$ and select an adapter 212 that supports the protocol used by the target VNF components $116_T$; and an adapter 212, created at the time of initialization, that includes API mappings 214 to map Application Programming Interfaces (APIs), e.g., commands from the VNF manager 106, as defined in the VNF descriptors 112, to commands in a protocol supported by the VNF components 116*i*. For instance, the adapters 212 can support one of the provisioning protocols, such as Chef, Ansible®, Netconf, and Secure Shell (SSH), as may be supported by the VNF components 116*i*. This allows the VNF controller component 200 to interface with VNF components 116*i* provided by different vendors. (Ansible is a registered trademark of Red Hat, Inc. throughout the world; and SSH is a registered trademark of SSH Communications Security Corporation).

The adapter 212 generates the command in the supported protocol 216 and transmits the command to a target VNF component $116_T$. The APIs from the VNF manager 106 may comprise lifecycle operations, such as update, restart and validate VNF resources, including snapshot management, migration management, recovery, performance, etc.

Figure 3:
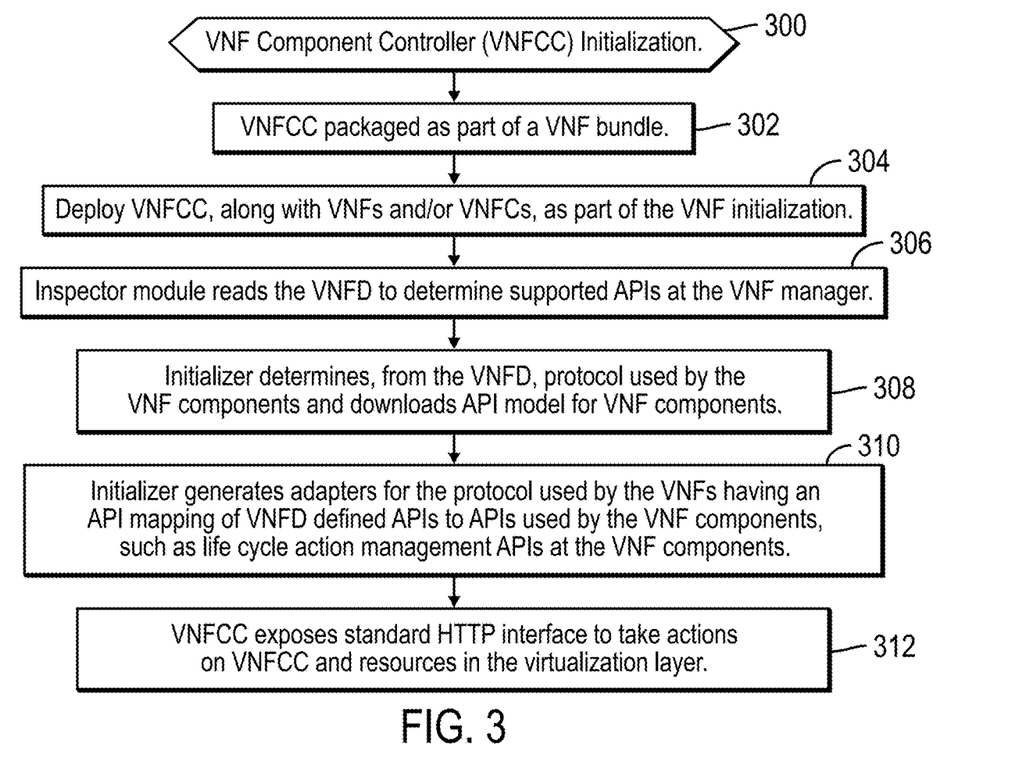
FIG. 3 illustrates an embodiment of operations to initialize the VNF controller component.

FIG. 3 illustrates an embodiment of operations to initialize and prepare the VNF controller component 200. Upon initializing (at block 300) the VNF controller component 200, the VNF manager 106 may package (at block 302) and deploy (at block 304) the VNF controller component 200 along with VNFs 102 and/or VNFCs $116_i$. The inspector 202 reads (at block 306) the VNF descriptors 112 to determine the supported APIs at the VNF manager 106. The initializer 204 determines (at block 308), from the VNF descriptors 112 the protocol used by the VNF components 116*i* and downloads API models for the VNF components 116*i*. The initializer 204, or other component, generates (at block 310) adapters 212 for the protocol used by the VNFs having an API mapping 214 of VNF descriptor 112 defined APIs to APIs used by VNF components 116*i*. e.g., Chef, Ansible®, etc. After initialization, the VNF controller component 200 exposes (at block 312) the protocol used by the VNF manager 106, such as HTTP, to allow the VNF manager 106 to take actions on the VNF controller component 200 and on resources in the virtualization layer 122.

With the embodiment of FIG. 3, the VNF controller component 200 is configured to allow the VNF manager 106 to seamlessly interact with VNF components 116*i* from different vendors supporting different protocols through the adapters 212 that support the different protocols the VNF components 116*i* implement. The adapters 212 are configured during initialization to support all the APIs and commands that may be issued by the VNF manager 106 as defined in the VNF descriptors 112 of the VNF package 114.

Figure 4:
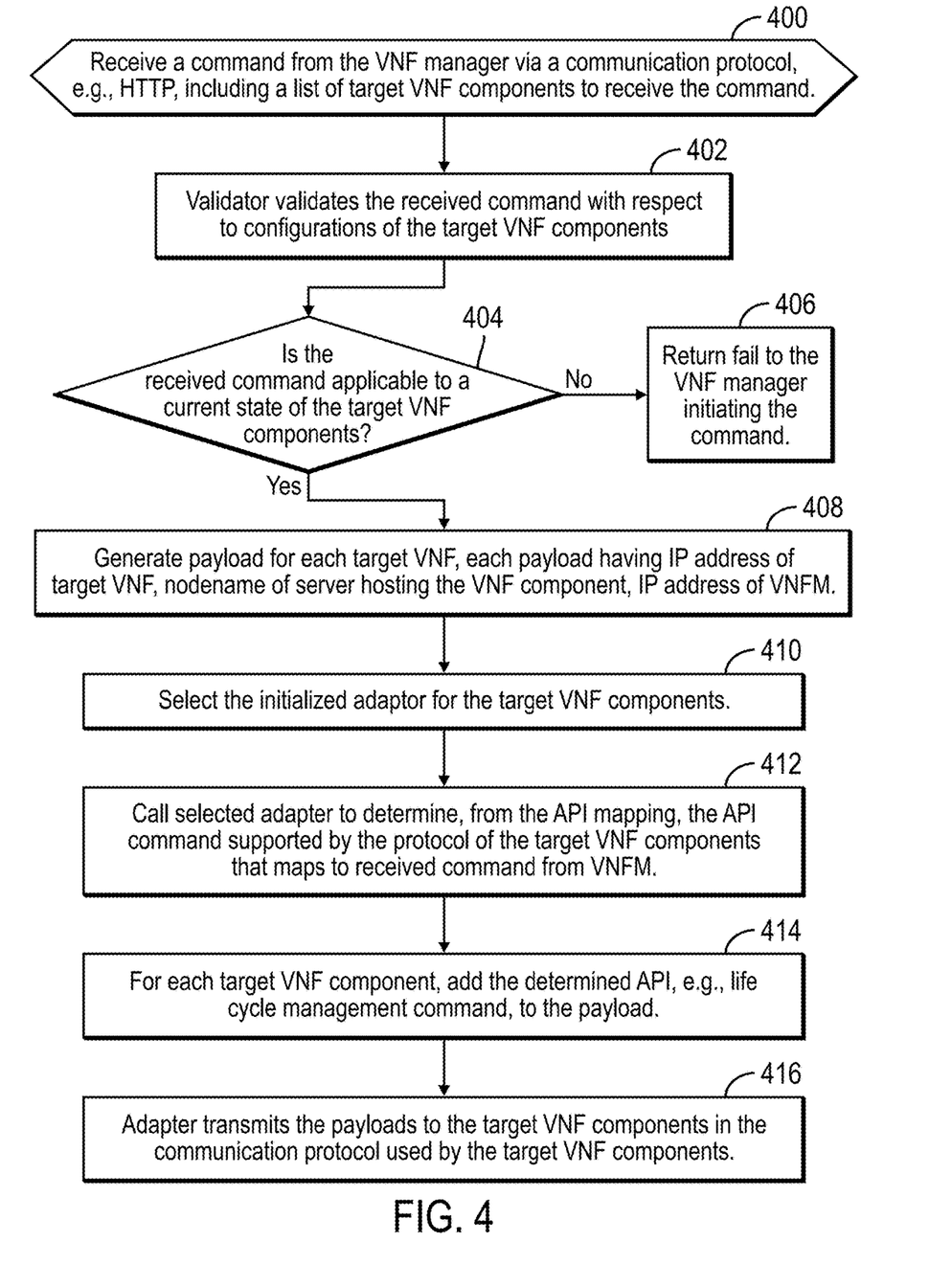
FIG. 4 illustrates an embodiment of operations of the VNF controller component to process a command from a VNF manager to forward to target VNF components.

FIG. 4 illustrates an embodiment of operations performed by the VNF controller component 200 to process an API or lifecycle management type command from the VNF manager 106 with respect to one or more target VNF components $116_T$. Upon receiving (at block 400) a command, e.g., API, from the VNF manager 106 via a communication protocol, e.g., HTTP, including a list of one or more target VNF components $116_T$ to receive the command, the validator 208 validates (at block 402) the received command/API with respect to configurations of the target VNF components $116_T$. If (at block 404) the received command is not applicable to a current state of the target VNF components $116_T$, such as they have already been updated, shut down, etc., then fail is returned (at block 406) to the VNF manager 106 that initiated the command. If (at block 404) the received command is applicable to the current state of the target VNF components $116_T$, then the configuration generator 210 generates (at block 408) a payload for each target VNF component $116_T$, each payload having the IP address of the target VNF component $116_T$, node name of server hosting the target VNF component $116_T$, IP address of VNFM 106, etc. The configuration generator 210 selects (at block 410) the initialized adapter 212 that supports the protocol(s) implemented at the target VNF components $116_T$. The configuration generator 210 calls (at block 412) the selected adapter(s) 212 to determine, from the API mapping 214, the API command supported by the protocol of the target VNF components $116_T$ that maps to the received command from VNF manager 106. The adapter 212, for each target VNF component $116_T$, adds the determined API, e.g., life cycle management command, to the payload and transmits (at block 416) the payloads to the target VNF component $116_T$ using the protocol supported by the target VNF components $116_T$.

Figure 5:
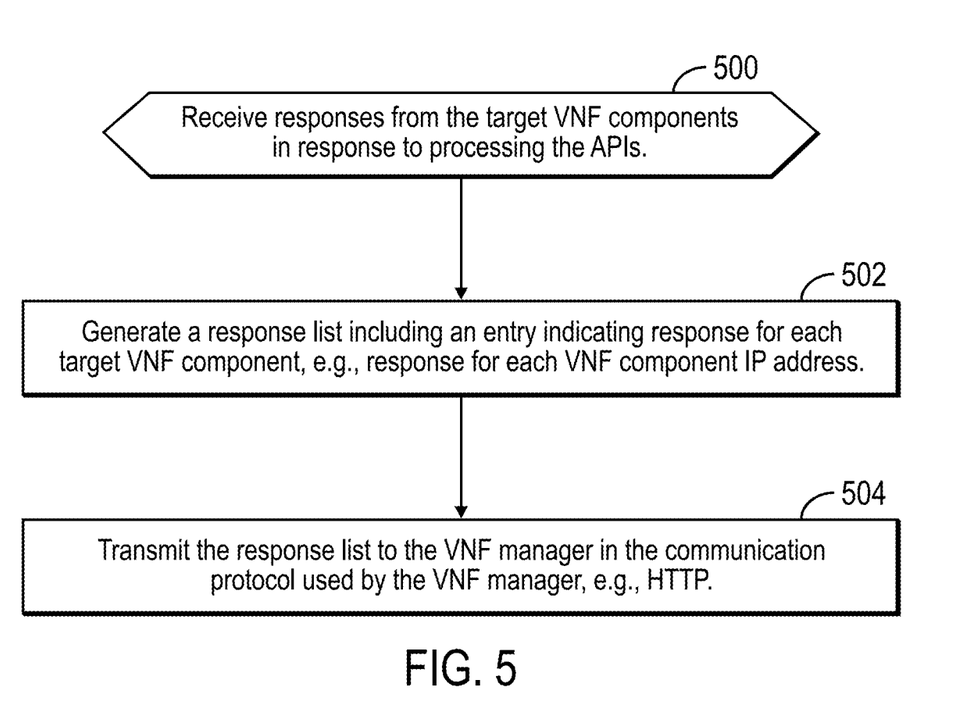
FIG. 5 illustrates an embodiment of operations of the VNF controller component to return responses from target VNF components processing the command from the VNF manager.

FIG. 5 illustrates an embodiment of operations performed by the VNF controller component 200 to process responses from the target VNF components $116_T$ that have processed the API in the protocol supported by the VNF components $116_T$. Upon receiving (at block 500) responses from the target VNF components $116_T$ in response to processing the APIs in the protocol supported by the target VNF components $116_T$, the VNF controller component 200 generates (at block 502) a response list including an entry indicating the response for each target VNF component $116_T$. The response list may include the IP address of each target VNF component $116_T$ and the response for that component. The VNF controller component 200 transmits (at block 504) the response list to the VNF manager 106 in the communication protocol supported by the VNF manager 106, such as HTTP.

With the embodiment of FIGS. 4 and 5, the VNF controller component 200 acts as a mediation layer on top of the VNF configuration protocol which supports a VNF component custom protocol on southbound interfaces and exposes standard HTTP requests on a northbound interface to the VNF manager 106. This allows the MANO node 104 to integrate with VNF components supporting heterogenous command and communication protocols. The VNF controller component 200 acts as a proxy for the VNF manager 106 to manage communication with the VNF components 116i regardless of the protocol they support. Further, the VNF controller component 200 may continue to manage the VNF components 116i even if communication with the VNF manager 106 is disrupted.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
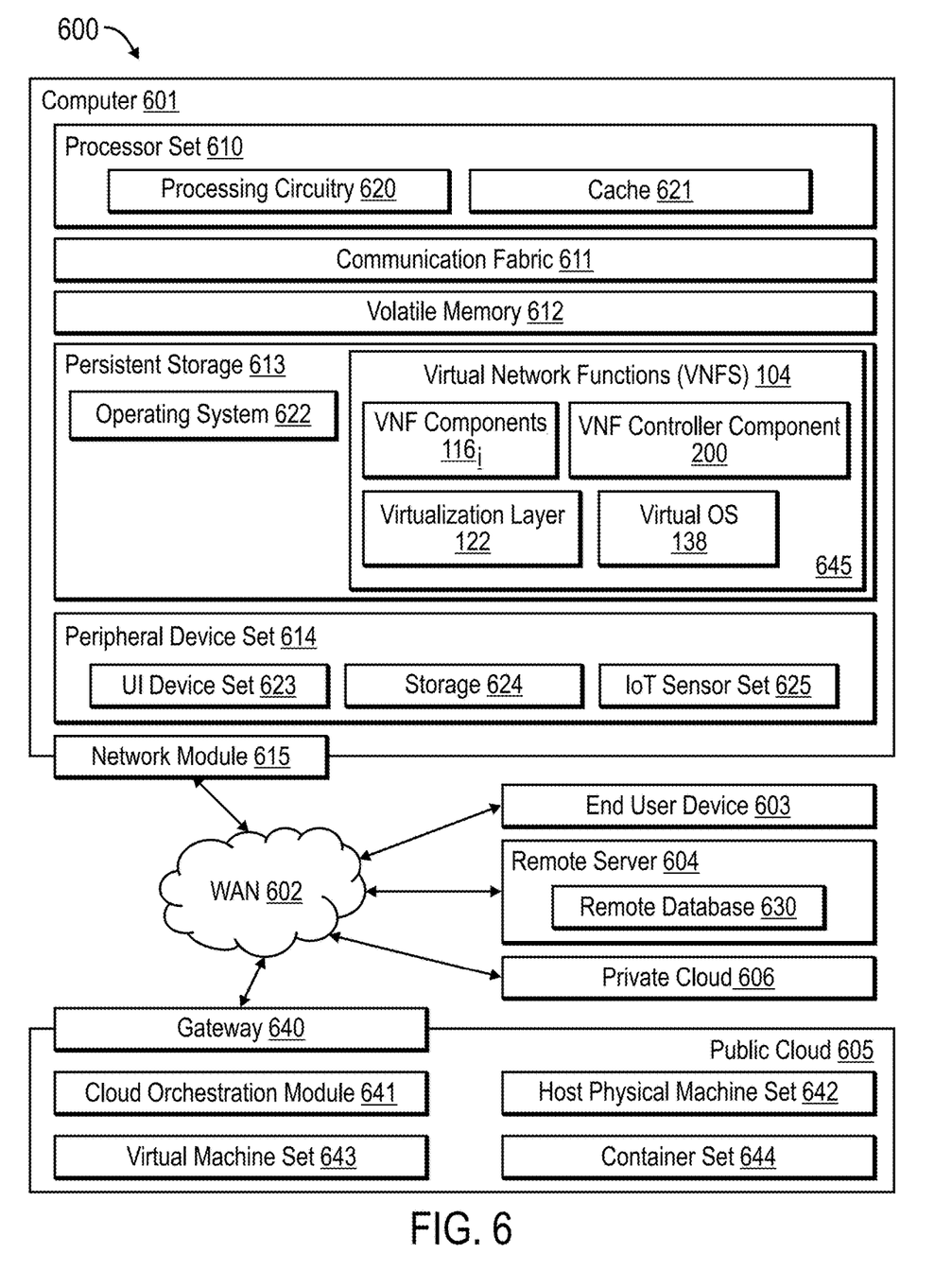
FIG. 6 illustrates a computing environment in which the components of FIG. 1 may be implemented.

With respect to FIG. 6, computing environment 600 contains an example of an environment for the execution of at least some of the computer code involved in performing the inventive methods, such as a VNF controller component 200 to provide a mediation layer between the VNF manager 106 and VNF components 116i in block 645, which includes the VNFs 102, VNF controller component 200, virtualization layer 122, and virtual OS 138 as described with respect to FIGS. 1 and 2. In addition to block 645, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 645, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing. The physical compute 126 may comprise the processor set 610 and its allocatable processor resources.

Computer-readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 645 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface-type operating systems that employ a kernel. The code included in block 645 typically includes at least some of the computer code involved in performing the inventive methods. The physical storage 128 may be allocated from the volatile memory 612 and persistent storage 613.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer-readable program instructions for performing the inventive methods can typically be downloaded to computer 601 from an external computer or external storage device through a network adapter card or network interface included in network module 615. The physical network 130 may be allocated from the network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604. The MANO node 104 may be implemented in the remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602. In further embodiments, the cloud orchestration module 641 may comprise the MANO node 104, the virtual machine set 643 may comprise the virtual network functions 102, including VNF controller component 200, virtualization layer 122, and virtual OS 138, and the physical infrastructure 124 may comprise the host physical machine set 642.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

CLOUD COMPUTING SERVICES AND/OR MICROSERVICES (not separately shown in FIG. 6): private and public clouds 606 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i, n, T among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing commands to virtual network functions in a virtual computing environment, the computer program product comprising a computer readable storage medium having computer readable program code embodied therein that when executed performs operations, the operations comprising:

receiving a first command in a first communication protocol to perform an operation at a target virtual network function component managing a virtual resource;

determining a second command in a second communication protocol mapping to the first command to perform a function of the first command at the target virtual network function component; and communicating the second command using the second communication protocol to the target virtual network function component to perform an operation with respect to the virtual resource managed by the target virtual network function component.

2. The computer program product of claim 1, wherein the operations further comprise:

maintaining adapters implementing different communication protocols to map a command in the first communication protocol to communication protocols implemented by adapters, wherein an adapter for the second communication protocol determines the second command to communicate to the target virtual network function component using the second communication protocol.

3. The computer program product of claim 1, wherein the first command is received from a virtual network function manager at a remote location, and wherein the virtual resource, the target virtual network function component, and the computer program product are located at a tenant location.

4. The computer program product of claim 1, wherein the operations further comprise:

reading a descriptor defining the first communication protocol and commands to apply to the target virtual network function component;

determining the first communication protocol from the descriptor; and generating mapping of commands in the first communication protocol defined in the descriptor to commands in the second communication protocol supported by the target virtual network function component.

5. The computer program product of claim 1, wherein the operations further comprise:

loading configurations of virtual network functions indicating a current state of the virtual network functions;

validating the first command with a configuration of the target virtual network function component to which the first command is directed to determine whether the first command is applicable to a current state of the target virtual network function component;

selecting an adapter for the target virtual network function component, wherein the selected adapter provides a mapping of the first command in the first communication protocol to the second command in the second communication protocol; and transmitting, by the selected adapter, the second command to the target virtual network function component using the second communication protocol.

6. The computer program product of claim 1, wherein the first command includes a list of a plurality of target virtual network function components to receive the first command, wherein the communicating the second command comprises communicating the second command to the target virtual network function components using the second communication protocol.

7. The computer program product of claim 6, wherein the first command is received from a virtual network function manager using the first communication protocol, wherein the operations further comprise:

receiving responses from the target virtual network function components to the second command communicated to the target virtual network function components;

generating a response list identifying the target virtual network function components and results of processing of the second command at the target virtual network function components; and transmitting the generated response list using the first communication protocol to the virtual network function manager.

8. The computer program product of claim 1, wherein the first communication protocol comprises a Hypertext Transport Protocol (HTTP), and wherein the first command comprises a life cycle management application programming interface (API) to configure the target virtual network function component.

9. A system for managing commands to virtual network functions in a virtual computing environment, comprising:
a processor; and
a computer program product comprising a computer readable storage medium having computer readable program code embodied therein that when executed performs operations, the operations comprising:
receiving a first command in a first communication protocol to perform an operation at a target virtual network function component managing a virtual resource;
determining a second command in a second communication protocol mapping to the first command to perform a function of the first command at the target virtual network function component; and
communicating the second command using the second communication protocol to the target virtual network function component to perform an operation with respect to the virtual resource managed by the target virtual network function component.

10. The system of claim 9, wherein the operations further comprise:
maintaining adapters implementing different communication protocols to map a command in the first communication protocol to communication protocols implemented by adapters, wherein an adapter for the second communication protocol determines the second command to communicate to the target virtual network function component using the second communication protocol.

11. The system of claim 9, wherein the first command is received from a virtual network function manager at a remote location, and wherein the virtual resource, the target virtual network function component, and the computer program product are located at a tenant location.

12. The system of claim 9, wherein the operations further comprise:
reading a descriptor defining the first communication protocol and commands to apply to the target virtual network function component;
determining the first communication protocol from the descriptor; and
generating mapping of commands in the first communication protocol defined in the descriptor to commands in the second communication protocol supported by the target virtual network function component.

13. The system of claim 9, wherein the first command includes a list of a plurality of target virtual network function components to receive the first command, wherein the communicating the second command comprises communicating the second command to the target virtual network function components using the second communication protocol.

14. The system of claim 13, wherein the first command is received from a virtual network function manager using the first communication protocol, wherein the operations further comprise:
receiving responses from the target virtual network function components to the second command communicated to the target virtual network function components;
generating a response list identifying the target virtual network function components and results of processing of the second command at the target virtual network function components; and
transmitting the generated response list using the first communication protocol to the virtual network function manager.

15. A computer implemented method for managing commands to virtual network functions in a virtual computing environment, comprising:
receiving a first command in a first communication protocol to perform an operation at a target virtual network function component managing a virtual resource;
determining a second command in a second communication protocol mapping to the first command to perform a function of the first command at the target virtual network function component; and
communicating the second command using the second communication protocol to the target virtual network function component to perform an operation with respect to the virtual resource managed by the target virtual network function component.

16. The method of claim 15, further comprising:
maintaining adapters implementing different communication protocols to map a command in the first communication protocol to communication protocols implemented by adapters, wherein an adapter for the second communication protocol determines the second command to communicate to the target virtual network function component using the second communication protocol.

17. The method of claim 15, wherein the first command is received from a virtual network function manager at a remote location, and wherein the virtual resource, the target virtual network function component, and the computer implemented method are located at a tenant location.

18. The method of claim 15, further comprising:
reading a descriptor defining the first communication protocol and commands to apply to the target virtual network function component;
determining the first communication protocol from the descriptor; and
generating mapping of commands in the first communication protocol defined in the descriptor to commands in the second communication protocol supported by the target virtual network function component.

19. The method of claim 15, wherein the first command includes a list of a plurality of target virtual network function components to receive the first command, wherein the communicating the second command comprises communicating the second command to the target virtual network function components using the second communication protocol.

20. The method of claim 19, wherein the first command is received from a virtual network function manager using the first communication protocol, wherein the operations further comprise:
receiving responses from the target virtual network function components to the second command communicated to the target virtual network function components;
generating a response list identifying the target virtual network function components and results of processing of the second command at the target virtual network function components; and
transmitting the generated response list using the first communication protocol to the virtual network function manager.

* * * * *